United States Patent [19]
Hofmeister

[11] Patent Number: 5,725,341
[45] Date of Patent: Mar. 10, 1998

[54] SELF FUSING FASTENER

[76] Inventor: Oskar Hofmeister, 1201 E. Las Palmaritas, Phoenix, Ariz. 85020

[21] Appl. No.: 780,206

[22] Filed: Jan. 8, 1997

[51] Int. Cl.⁶ .......................... F16B 13/04; E16B 39/02
[52] U.S. Cl. ..................... 411/23; 411/38; 411/82; 411/258
[58] Field of Search .................. 411/32, 34, 37, 411/38, 55, 82, 258, 930

[56] References Cited

U.S. PATENT DOCUMENTS

| | | |
|---|---|---|
| 4,185,438 | 1/1980 | Fischer .............................. 411/82 X |
| 4,263,832 | 4/1981 | Lang . |
| 4,425,065 | 1/1984 | Sweeney . |
| 4,659,269 | 4/1987 | Stromiedel . |
| 4,830,558 | 5/1989 | Sweeney . |
| 5,007,780 | 4/1991 | Hoffman . |
| 5,044,852 | 9/1991 | Sweeney . |
| 5,205,688 | 4/1993 | Sundstrom ...................... 411/38 |
| 5,207,750 | 5/1993 | Rapata ............................ 411/38 |
| 5,339,593 | 8/1994 | Ludwig . |

*Primary Examiner*—Neill R. Wilson
*Attorney, Agent, or Firm*—Michael L. White, P.C.

[57] ABSTRACT

I claim a self fusing fastener device with radially expansible wings that permanently lock into place through an adhesive means which causes the fastener to act as a single rigid attaching element that resists pull out as a result of the interference fit produced by the radially expansible folding and flaring elements.

20 Claims, 2 Drawing Sheets

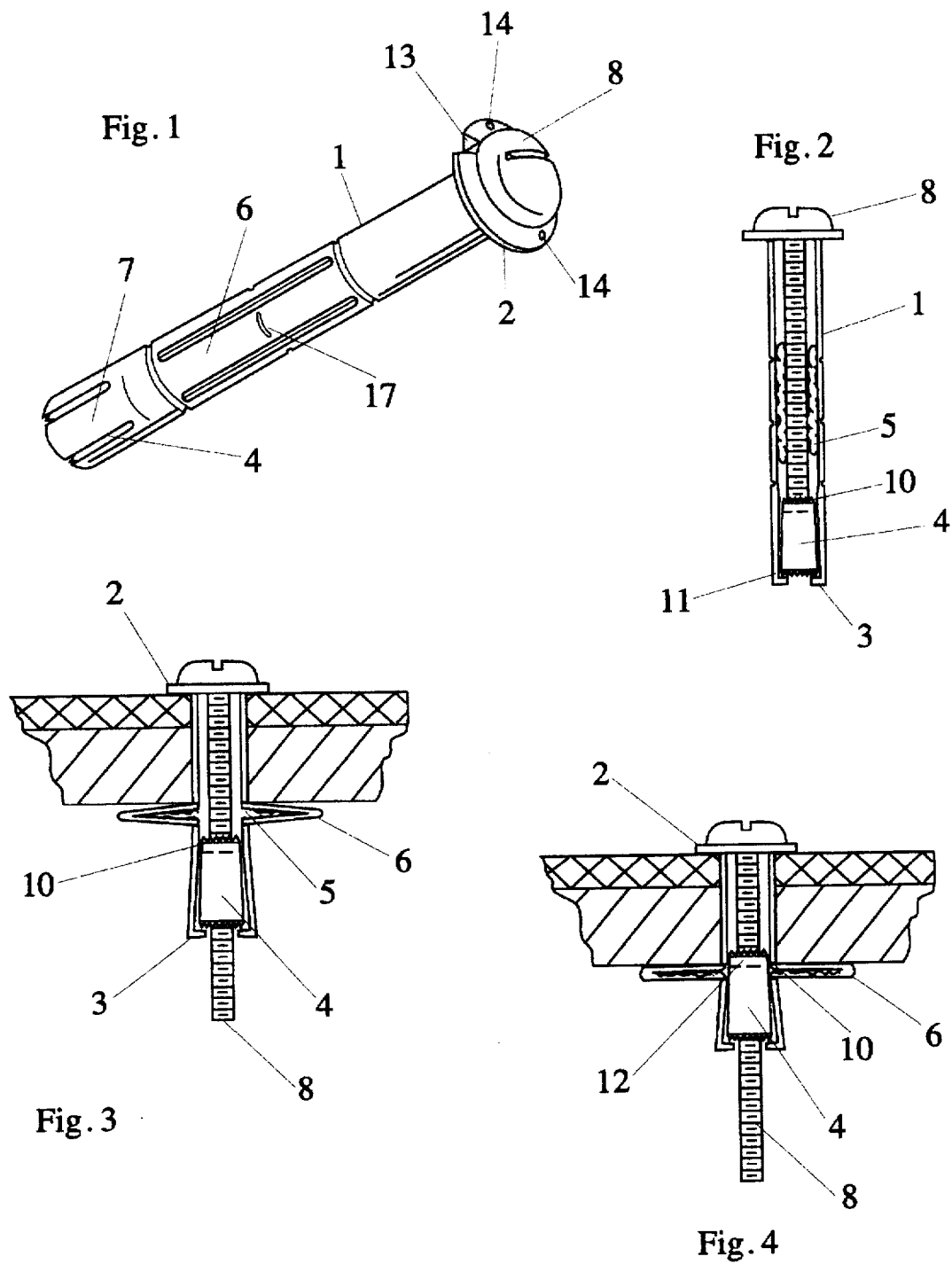

SELF FUSING FASTENER

BACKGROUND OF THE INVENTION

This invention relates to a fastener that can be used in a variety of structural applications, including the attachment of overlapping membranes, for use as an embedded anchor, or to affix objects to a hollow wall.

DESCRIPTION OF THE RELATED ART

Two of the most troublesome fastener applications are to a hollow wall section and to a solid substrate. In both cases the material in which the fastener is often set often cannot adequately grip the fastener to resist pull out forces. Examples of these materials include drywall, concrete, and sheet metal. Fasteners that merely rely on material grip strength on the fastener cannot attain satisfactory pull out loads. This problem is approached in one of two ways. Either a mechanical interference fit is created or an adhesive is used to affix the fastener in both these applications.

Lack of grip strength is often found in conjunction with weak membrane shear strength. As a result, even if the gripping strength of the fastener were sufficient, concentrated forces at the fastener membrane interface may allow the fastener to pull the membrane out.

Another commonly encountered problem occurs when attaching objects to hollow walls membranes with inaccessible interior surfaces. Either the fastener is attached directly to the substrate or the fastener is mounted to the hollow wall's interior surface. The fastener's direct attachment is typically accomplished solely through the use of an adhesive that secures the fastener to the substrate. The drawback to this approach is that the fastener's holding strength is limited by either the adhesive bond strength or the substrate's surface shear strength. Direct attachment to the substrate produces a physically weaker structure because the wall provides no shear strength support as it would for a fastener that extends through the wall surface. An additional drawback is that once in place, the installation is permanent and cannot be removed without damaging the wall.

Alternately, the fastener can be mounted to the interior surface of the membrane using expandable fasteners. The fastener is placed into a bore hole made into the membrane. The fastener is then caused to expand. This creates an interference fit behind the membrane surface that prevents fastener disengagement.

U.S. Pat. No. 4,659,269 to Stromiedel (1987) discloses a fastener with radially expansible portions made from relatively flexible deformable materials. This flexibility reduces the rigidity of the fastener reducing its holding strength. Forces exerted on these fasteners may cause relative movement between the fastener and wall surface. This prevents the fastener from accomplishing the critical functional requirement of providing rigid support.

U.S. Pat. No. 4,425,065 to Sweeney (1984) discloses a fastener design that utilizes an interference fit with the interior membrane surface that is adhesively fixed in place. The drawback of this design is that the fastener's expansion creates a minimal interference area with the surface membrane. Fastener pull out forces are transferred to this relatively small area. This creates highly localized stresses in these fastener components and at the wall where these fastener components abut. The fastener design forces these load-bearing elements to be extremely small in proportion to the fastener's overall size. As a result the fastener's inefficient design causes its rated load-bearing strength to be severely derated in relation to the fastener's size.

The close tolerances required to achieve an interference fit between the wall surface and the expanded portions of the fastener also limits the usefulness of this design. If the deployed fastener does not contact the wall surface, the fastener will be free to slide relative to the wall for the nonengagement distance. This free movement distance is sufficient to render the fastener nonfunctional in many applications.

Embedded fasteners for use as anchors in solid surfaces present a somewhat different problem. The prior art teaches that a purely adhesive means can be used to affix a fastener in a solid substrate. The ability of the adhesive means to resist pull out forces is determined by the weakest bond produced by either the adhesive to the fastener, the adhesive to the substrate, or the adhesive shear strength. The prior art also teaches that a mechanical interference can be established to anchor a fastener in a solid substrate. The drawback with this method is that these anchors are often embedded in concrete that may have loose aggregate around the peripheral edges of the bore hole. As a result the mechanical interference fit may slip due to the loose aggregate.

SUMMARY OF THE INVENTION

The present invention overcomes the disadvantages and shortcomings of the prior art described above. The operating principal of the present invention is the creation of an interference fit between the fastener and a substrate in which it is embedded or attached. This objective is accomplished by the fastener's radial expansion after it is set in its bore hole. The fastener's transformed geometry is permanently fixed with an adhesive or fusing material released from within the fastener.

The chief design advantage of this fastener is that it employs both an interference fit and adhesive means to secure the fastener in position. The interference fit that results mechanically prevents the fastener's disengagement from the substrate to which it is affixed. The fastener's new structure is engineered to uniformly distribute stresses that the fastener is expected to incur, thus improving the fastener's rated load capacity. The inter-bracing of fastener components uniformly distributes stresses throughout the fastener. Load capacity is enhanced not only from the geometrical transformation, but also from the lamination of multiple layers of materials that create a composite with increased material strength.

Load-bearing strength is difficult to attain because the membrane sections are often thin and weak. This makes it difficult for any fastener to hold a significant load. This fastener however can evenly distribute imposed forces over a large membrane area to prevent fastener pull out. Thus, this design is an advancement over U.S. Pat. No. 4,425,065 to Sweeney (1984) because of this much larger effective interference area.

Besides the objects and advantages of the present invention described above, several additional objects and advantages of the present invention are:

1. This fastener, unlike many other designs, has a number of multi functional applications. The fastener may be mounted inside a hollow surface which is otherwise inaccessible, it may be completely embedded in a solid substrate, or used to attach overlapping panels. This allows one fastener to be used in many applications reducing inventory requirements.
2. The self fusing fastener may be made entirely from plastic thus eliminating corrosion and the possibility of creating a ground when the device is used in electrical applications.

3. Mechanical fasteners, particulary the threaded type, are prone to failure because of high ambient vibration. Vibration can result in the loss of preload, and even the disengagement of the fastener. The present invention precludes this possibility because the fastener adhesively permanently locks the screw threads. As a result, the design of the present invention eliminates one of the primary fastener failure modes.

4. In an application where the fastener projects thru a membrane and attaches to the membrane's inside surface, the prior art teaches a combination of mechanical and adhesive means to affix the fastener. Because the adhesive distribution to the substrate surface is not controlled, the bond strength will vary from installation to installation. Thus, the fastener's load rating is indeterminate. The present invention's holding strength is dictated solely by the fastener's mechanical elements. Because the fasteners' dimensions, geometry, and materials of construction are known, the fastener's rated strength can be determined on a consistent and reliable basis. This allows the fastener to be use in critical engineered applications.

5. In an application where the fastener is embedded in a solid substrate, the fastener uses a combination of mechanical and adhesive means to resist pull out forces. This combination results in a rated pull out strength greater then could be achieved by either means alone. The mechanical interference fit creates a wedge against pull out forces that the adhesive maintains.

6. The installation of the present invention is easier than other available fasteners on the market. The present invention may be installed in a single step. Other fastener designs on the market require multiple steps to complete installation.

7. The present invention is held in place by purely mechanical means which does not require precise adhesive distribution to obtain maximum installation strength.

Still, further objects and advantages will become apparent from a consideration of the ensuing description and drawings.

This self fusing fastener provides a convenient, strong, and reliable method to affix objects to a variety of difficult applications. These applications include affixing objects to hollow walls and providing anchorage in solid substrates. This fastener can service a number of different applications without sacrificing strength because it combines both an adhesive and mechanical means to affix the fastener. The fastener's design allows it to attain maximum load bearing strength, reliability, and simplicity of installation.

Although the discussion above contains many specifics, these should not be construed as limiting the scope of the invention but as merely providing illustrations of some presently preferred embodiments of this invention. Although a specific embodiment of this invention has been described, it is apparent that some minor changes of structure and operation could be made without departing from the spirit of the invention as defined by the scope of the appended claims.

For example, the number of folding and flaring elements and the specific geometry of the fastener can be altered dependent on the specific application to which the fastener will be applied. Thus, the appended claims and their legal equivalents should determine the scope of the invention, rather than by the examples provided.

BRIEF DESCRIPTION OF THE DRAWINGS

FIG. 1 is a perspective view of a complete self fusing fastener, with both types of expandable elements, and adhesive material, before installation.

FIG. 2 is a side sectional view of a complete self fusing fastener, with both types of expandable elements, and adhesive material, before installation.

FIG. 3 is a side sectional view of a complete self fusing fastener of FIG. 1 in its installed configuration in a hollow wall.

FIG. 4 is a side sectional view of a complete self fusing fastener of FIG. 1 in its installed configuration in a completely collapsed position in a hollow wall.

DESCRIPTION OF THE PREFERRED EMBODIMENTS

Figure 5:
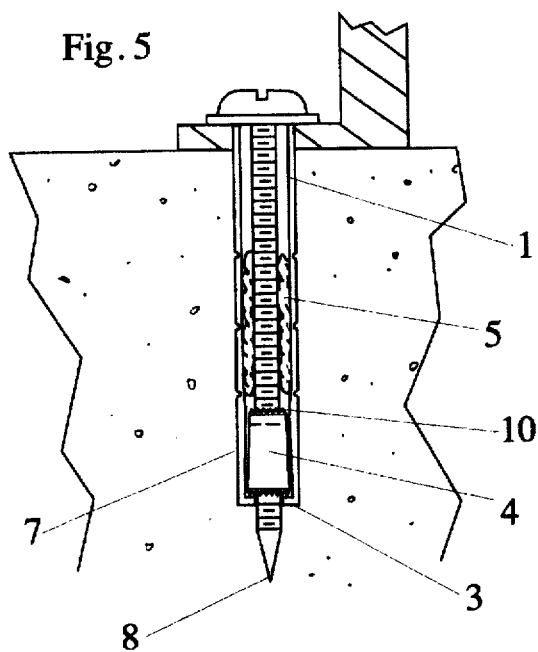
FIG. 5 side sectional view of a complete self fusing fastener of FIG. 1 in its installed configuration in an embedded application.

This invention advances the fastener state of the art by providing a stronger, easier to install fastener, that can produce consistent reliable load ratings. A preferred embodiment of the present invention is illustrated in FIG. 1 (perspective view) and FIG. 2 (cross section view). The present invention consists of a fastener tube 1 with a concentric bore. The fastener tube 1 is comprised of three cylindrical sections. The middle tube section has flexible folding elements 6. The second tube section has flaring elements 7 at the far end of fastener tube 1. Shoulder 3 extends radially inward and contains a bore concentrically aligned with the tube bore. The first tube section terminates in a flange 2. The flange may also have projecting spikes 13 to prevent the flange from rotating during installation. The flange may also be prevented form rotating by using a tool inserted into the flange holding holes 14 to maintain the fastener's position. Holding fins 16 may also be placed around the first tube section to prevent rotation. Finally, an adhesive on the underside of the flange and in contact with the wall may also be used to prevent rotation. An adhesive packet 5 is located in the tube bore.

The fastener tube may be most easily formed from a single cylindrical tube with a bore. The folding elements 6 can be created by cutting a series of parallel axial slits along the fastener tube 1. These slits do not extend to either end of the tube 1. Each pair of slits forms a pair of folding elements 6. The collapse of these folding elements 6 can be controlled through the appropriate interior or exterior circumferential scoring 17 of the fastener tube. The flaring elements are most easily created by cutting a series of parallel slots from the end of the tube 1 opposite the flange 2. Contained within and captured by the tube 1 at the opposite end of the flange 2 is a plug 4. The plug 4 also has a hollow bore concentric with the fastener tube bore to receive a screw 8. The plug 4 may be threaded to receive the screw 8. The fastener plug 4 may be designed with a boss 12 designed to fit within the internal diameter of the first tube section. Extending from the boss 12 may be a barb 10 designed to puncture the adhesive packet 5 to release adhesive to the tube's interior.

Integral or attached to the plug 4 is a serrated member 11 that prevents rotational movement of the plug 4. The serrated outer circumference engages the tube's interior wall or shoulder interior wall to prevent plug rotation when the screw 8 engages the plug. The serrated member may be disc shaped with serrations along the outer circumference and a central bore to accommodate the screw. The serrated member may be metallic and internally threaded to engage the fastener screw. This increases the strength of the fastener by providing a metallic mating surface for the screw threads that will resistant pull out forces more effectively then could be attained with the plastic plug alone.

The preferred embodiment of this invention uses plastic materials for the fastener tube and the plug. This fastener however, is not limited to polymer materials. Other materials such as metals may also be employed. The plastic selected should belong to a class of plastic that provides a high level of elasticity such as polyamide polymers. Other potential plastics include polyvinyl chloride (PVC) and acrylo-nitrile-butadiene-styrene (ABS). A myriad of other plastic materials may be utilized and specifically selected on the basis of engineering design features that vary with the particulars of any specific application. These polymers may be reinforced with fillers, such as glass fibers to attain higher strengths or other desired properties.

The fastening screw may be metallic or plastic. A plastic screw offers the significant advantage of electrical non-conductivity where a metallic screw may cause a ground. The all plastic fastener is also corrosion free.

The adhesive material may be selected from a myriad of available adhesives. The specific type selected is dependent on the fastener materials of construction, the substrate material, the bond strength desired, etc. A quick setting adhesive is the most practical for use with the present invention. These adhesive classes include, but are not limited, to cyanoacrylates, anaerobics, and epoxies. Furthermore, adhesives that are not normally quick setting at normal ambient conditions may be accelerated through the appropriate accelerator to cure the adhesive. Although a quick setting adhesive is the preferred embodiment, a slower setting adhesive may be utilized in certain embodiments of the present invention. Embodiments that use a screw can maintain the fastener position until the adhesive has sufficient time to set.

Obviously a number of different adhesive materials and associated packaging systems could be employed within the fastener. Any adhesive may be appropriate provided it can permanently affix the fastener in its transformed geometry. The adhesive may be packaged in any manner provided it meets the one functional requirement that it contain the adhesive until such time that the fastener is expanded. These adhesives may be packaged in breakable plastic packets. These packets release their contents either when the fastener screw is inserted into the fastener tube or when the fastener collapses. Multiple packets may be supplied within the fastener. This allows the use of multi component adhesives. For example, epoxies that require a curing or cross linking component may be used in this fastener. Alternately the adhesive may be micro encapsulated for later release.

Finally, the adhesive material may be a fusing agent that chemically welds the plastics together. The fusing material causes two pieces of plastic to essentially melt together and reharden. PVC and ABS for example, may be chemically fused to form a single piece with the application of the appropriate solvents.

Figure 6:
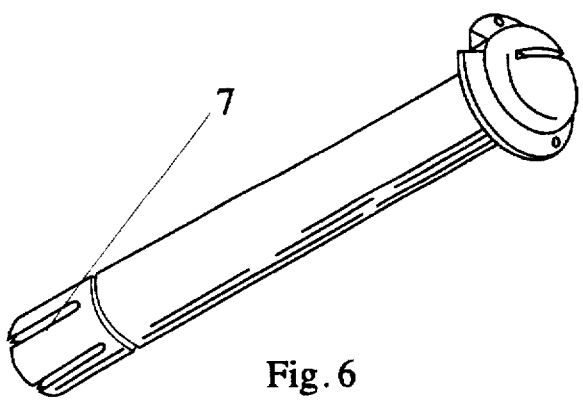
FIG. 6 is a perspective view of an alternative embodiment of the present invention with only the flaring elements.
Figure 7:
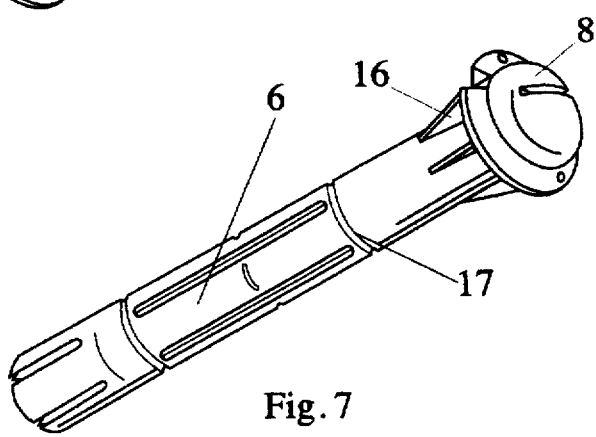
FIG. 7 is a perspective view of a second embodiment of the present invention with only the collapsing elements.

In addition to the preferred embodiment shown in FIG. 1, alternate embodiments can be created by selecting to have either the flaring elements or the folding elements based on the fastener's intended application. FIG. 6 shows the fastener with only the flaring elements whereas FIG. 7 only utilizes the folding elements.

Another embodiment of the present invention eliminates the fastener screw 8. A pull chord 9 attaches to the second end and extends through the tube bore and exits through the fastener flange 2. The pull chord terminates in a pull tab 15. The pull chord itself has a series of burrs 18 along the length of the chord that creates a unidirectional interference between the chord and the flange. This prevents the pull chord from being retracted, thus losing compression on the fastener's folding elements, once it is pulled into place. The pull chord may be cut off and a decorative button pushed into the fastener tube to hide the fastener flange and remnants of the pull chord. Alternately a fastener may be screwed into the tube or attached to the flange's outer surface.

The following operational description is for an application where the fastener projects thru a membrane and attaches to the membrane's inside surface. FIG. 1 shows the uninstalled fastener before insertion into the bore hole. The present invention is placed in a bore hole sized to fit the fastener tube 1 diameter. The fastener's flange 2 prevents the fastener from sliding through the bore hole. The flange may also have projecting spikes 13 that are driven into the membrane to prevent fastener rotation during installation. A screw 8 is placed through the flange end of the fastener and made to engage the fastener plug 4. The insertion of the screw 8 may be used to rupture the adhesive packet 5 and releases the adhesive along the interior of the tube. Because the tube 1 is not in its expanded position, the adhesive is contained within the tube and uniformly distributed along the tube's inner surface area.

Screw 8 is turned causing the fastener plug 4 to be urged toward the fastener flange 2. Holding holes in the flange may be used to prevent fastener rotation. Because of the fastener tube's interior-tapered surface, the plug's movement forces the fastener's flaring elements 7 to radially expand outward. Further movement of the flaring elements is stopped as the plug 4 is captured in the tapered tube section. As the screw action continues, plug travel causes the folding elements 6 to radially expand and separate. A barb 10 protruding from the plug 4 may be used to puncture the adhesive packet 5 as the fastener collapses. The collapse of the folding elements 6 allows the plug to continue to move toward the flange 2. Further movement of the plug 4 causes each of the folding elements 6 to fold in half.

The tube's collapse may be controlled by selectively reducing the folding element strength at the locations where it is desired that the fastener collapse. For example, circumferentially scoring of either the fastener tube's interior or exterior surfaces will control the tube's direction and points of collapse. In this manner the structural transformation of the tube may be closely controlled. This selective scoring also allows the fastener elements to completely fold together, allowing the adhesive to more effectively bond these elements.

When the plug approaches the interior wall surface resistance to movement increases until forward movement is halted. The boss 12 seats into the bore of first tube section 13. The adhesive material fuses the plastic folding elements, the plug, and the tube together into one interbraced fastening unit. In addition, the fastener's folding elements are now completely folded, and adhered together by the released adhesive. The released adhesive will also contact the interior wall. This causes the folding elements to adhere to the interior wall surface.

It should be noted that the above description is the preferred embodiment of the fastener. This fastener embodiment accommodates multiple fastening applications. This embodiment will also work in hollow walls, and for the connection of thin membrane sections as shown in FIG. 3 and FIG. 4. FIG. 3 shows the installed and semi-expanded fastener. FIG. 4 shows the installed fastener in the completely expanded position. It should be noted that alternative fastener designs may be made to contain either the folding elements or the flaring elements alone, thus specializing the fastener for a particular application.

Figure 8:
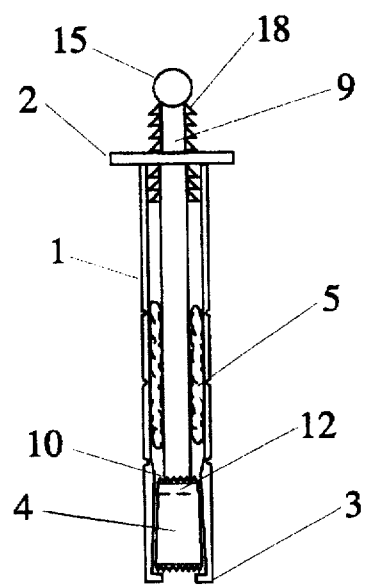
FIG. 8 is a side elevation view of a third embodiment of the present invention with a pull chord, before installation.

FIG. 8 shows an alternative embodiment of the present invention. In this embodiment a pull chord 9 is used to collapse the fastener, rather than a screw as shown in FIG. 1. The fastener embodiment shown in FIG. 8 can be used in the types of applications as shown in FIG. 3 and FIG. 4. When the chord is pulled, the plug 4 is drawn toward the fastener flange 2. This radially expands the flaring elements 7 and collapses the folding elements 6. It also punctures the adhesive packet 5 releasing the adhesive to lock the fastener in place. Forward motion of the plug is halted when the plug boss 12 engages and mates with the bore of the first tube section 13. Burrs 18 on the pull chord allow only unidirectional movement through the flange thus maintaining the position of the fastener as it collapses.

I claim:

1. An improved fastener that comprises:
   a) a tube having a bore extending there through, said tube having a first end and a second end, said tube having a first tube section with said first end, and a second tube section with said second end, a middle tube section between said first and said second tube sections, said second tube section is internally tapered to narrow the bore as the taper proceeds from the second end, said second tube section having a plurality of longitudinal slots, said slots circumferentially disposed around said second tube section and extending there through, said slots extending from the second end for the partial length of said second tube section, said middle section having a plurality of longitudinal slits, said slits circumferentially disposed around said middle tube section and extending therethrough,
   b) a flange extending radially outward from the first end of said tube,
   c) a shoulder extending radially inward from the second end of said tube,
   d) an adhesive mass disposed within said tube,
   e) a plug disposed within the bore of said second tube section, said plug having a bore, said plug bore concentrically aligned with said fastener tube bore, said plug captured inside said second tube section by said shoulder and the narrowed tapered section,
   f) a serrated member protruding from said plug and contacting said tube's inner surface whereby an interference contact is made between the serrated member and said tube wall preventing plug rotation,
   g) a screw having a head end and a threaded end, said screw extending through said tube bore, the thread end engaged with said plug.

2. An improved fastener device of claim 1 further comprising a means for preventing the rotation of the fastener tube.

3. An improved fastener device of claim 1 further comprising:
   a) a boss extending from said plug towards said first section whereby said boss may seat inside the bore of said first section.

4. An improved fastener device of claim 3 wherein the adhesive is disposed in an adhesive packet.

5. An improved fastener device of claim 4 further comprising:
   a) a barb extending from said boss towards said first section whereby said barb may puncture said adhesive packet.

6. An improved fastener that comprises:
   a) a tube having a bore extending there through, said tube having a first end and a second end, said tube having a first tube section with said first end, and a second tube section with said second end, a middle tube section between said first and said second tube sections, said middle section having a plurality of longitudinal slits, said slits circumferentially disposed around said middle tube section and extending therethrough,
   b) a flange extending radially outward from the first end of said tube,
   c) a shoulder extending radially inward from the second end of said tube, said shoulder having a bore concentrically aligned with said tube bore,
   d) an adhesive mass disposed within said tube,
   e) a screw having a head end and a threaded end, said screw extending through said tube bore and received by said shoulder bore, the screw's threaded end engaged with said shoulder.

7. An improved fastener device of claim 6 further comprising a means for preventing rotation of the fastener tube.

8. An improved fastener device of claim 6 further comprising:
   a) a boss extending from said shoulder towards said first section whereby said boss may seat inside the bore of said first section.

9. An improved fastener device of claim 8 wherein the adhesive is disposed in an adhesive packet.

10. An improved fastener device of claim 9 further comprising:
    a) a barb extending from said boss towards said first section whereby said barb may puncture said adhesive packet.

11. An improved fastener that comprises:
    a) a tube having a bore extending there through, said tube having a first end and a second end, said tube having a first tube section with said first end, and a second tube section with said second end, said second tube section is internally tapered to narrow the bore as the taper proceeds from the second end, said second tube section having a plurality of longitudinal slots, said slots circumferentially disposed around said second tube section and extending there through, said slots extending from the second end for the partial length of said second tube section,
    b) a flange extending radially outward from the first end of said tube,
    c) a shoulder extending radially inward from the second end of said tube,
    d) an adhesive mass disposed within said tube,
    e) a plug disposed within the bore of said second tube section, said plug having a bore, said plug bore concentrically aligned with said fastener tube bore, said plug captured inside said second tube section by said shoulder and the narrowed tapered section,
    f) a serrated member protruding from said plug and contacting said tube's inner surface whereby an interference contact is made between the serrated member and said tube wall preventing plug rotation,
    g) a screw having a head end and a threaded end, said screw extending through said tube bore, the thread end engaged with said plug, and the screw head adjacent to said flange.

12. An improved fastener device of claim 11 further comprising:
   a) a boss extending from said plug towards said first section whereby said boss may seat inside the bore of said first section.

13. An improved fastener device of claim 12 wherein the adhesive is disposed in a breakable plastic packet.

14. An improved fastener device of claim 13 further comprising:
   a) a barb extending from said boss towards said first section whereby said barb may puncture said adhesive packet.

15. An improved fastener that comprises:
   a) a tube having a bore extending there through, said tube having a first end and a second end, said tube having a first tube section with said first end, and a second tube section with said second end, a middle tube section between said first and said second tube sections, said middle section having a plurality of longitudinal slits, said slits circumferentially disposed around said middle tube section and extending therethrough.
   b) a flange extending radially outward from the first end of said tube.
   c) a shoulder extending radially inward from the second end of said tube, said shoulder having a bore concentrically aligned with said tube bore.
   d) an adhesive mass disposed within said tube.
   e) a pull chord affixed to said plug and extending through said tube bore and exiting the first end of said tube.

16. An improved fastener device of claim 15 wherein the pull chord has a plurality of burrs disposed linearly along the pull chord whereby the pull chord is limited to unidirectional motion caused by the interference of the burrs with said flange.

17. An improved fastener device of claim 16 wherein the pull chord terminates in a pull tab.

18. An improved fastener device of claim 15 further comprising
   a) a boss extending from said shoulder towards said first section whereby said boss may seat inside the bore of said first section.

19. An improved fastener device of claim 18 wherein the adhesive is disposed in an adhesive packet.

20. An improved fastener device of claim 19 further comprising
   a) a barb extending from said boss towards said first section whereby said barb may puncture said adhesive packet.

* * * * *